June 6, 1967  E. C. CHANEY  3,323,538

HEATED LIQUID STORAGE AND DISTRIBUTION DEVICE

Filed June 1, 1965  3 Sheets-Sheet 1

INVENTOR.
EARL C. CHANEY
BY
William C. Babcock
ATTORNEY

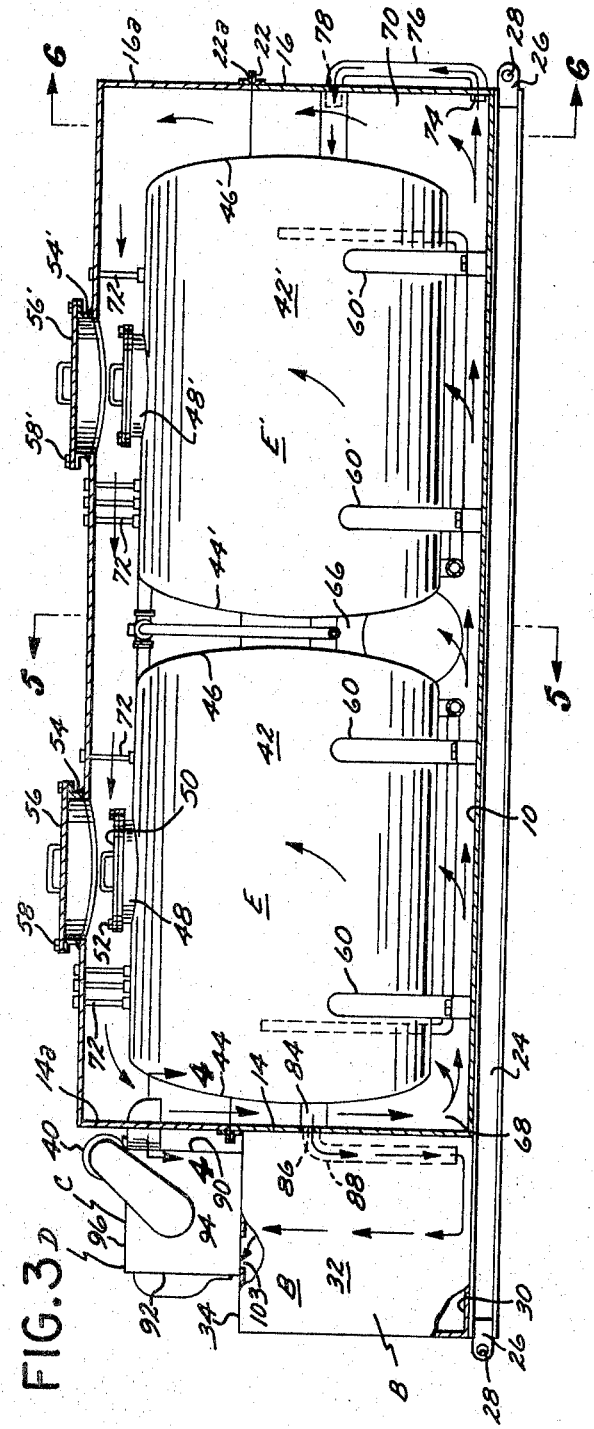

June 6, 1967        E. C. CHANEY        3,323,538
HEATED LIQUID STORAGE AND DISTRIBUTION DEVICE
Filed June 1, 1965        3 Sheets-Sheet 3

INVENTOR.
EARL C. CHANEY
BY
William C. Babcock
ATTORNEY

United States Patent Office 3,323,538
Patented June 6, 1967

3,323,538
HEATED LIQUID STORAGE AND DISTRIBUTION DEVICE
Earl C. Chaney, La Puente, Calif., assignor to George W. Hume, Whittier, Calif.
Filed June 1, 1965, Ser. No. 460,357
9 Claims. (Cl. 137—259)

The present invention relates generally to the field of heated storage facilities for liquids, and more particularly to a heated storage and distribution unit for oils, fats, and the like, that must be maintained at an elevated temperature to control the viscosity thereof.

Various oils and fats, such as lard, tallow, soya oil, peanut oil, cottonseed oil, and the like, are used extensively by commercial bakeries for shortening in their products. Such oils and fats must be maintained at a predetermined constant, elevated temperature which in most cases is substantially above that of the ambient atmosphere, in order that the liquid viscosity of the liquids may be controlled. In the past, storage of such liquids in heated tanks proved unsatisfactory, inasmuch as the temperature of a large stored body of such a liquid could not be accurately controlled, whereby cold spots develop in the tank at which the stored liquids stratify, congeal or become too thick to flow with the desired degree of freedom.

A major object of the present invention is to provide an improved storage unit for heated liquids, which is capable of maintaining a large body of fats at a desired, accurately controlled temperature, with said controlled temperature being substantially uniform throughout the entire body of the stored liquid.

Another object of the invention is to provide a storage unit for heated liquids that is compact, may be exposed to the weather without damage thereto, is of simple mechanical structure, can be fabricated from standard, commercially available materials, and retailed at a sufficiently reasonable price as to encourage the widespread use thereof.

Another object of the invention is to provide a storage unit for heated liquids in which the liquid-containing portion thereof is constantly subjected to a moving blanket of heated air to maintain the stored liquids at a substantially constant temperature, with the heat loss, due to the structure thereof, being held to a minimum.

A still further object of the invention is to furnish at least one elongate storage tank for the liquid which is subjected to heated air that constantly circulates in a longitudinally extending closed path therearound, with the coldest portion of the circulating air being withdrawn for reheating, which reheated air serves to replenish the heat of the circulating air for transfer to the stored liquid.

Another object of the invention is to provide a unit embodying a plurality of elongate liquid storage tanks disposed in end-to-end relationship which are maintained at a predetermined elevated temperature due to the fact that the entire exterior surfaces thereof are subjected to a blanket of heated air, which unit also includes pumping and piping means which permits discharge of liquid into any selected one of the tanks from a delivery carrier, permits the transfer of liquid from any one of said tanks to another thereof, and permits recirculation of liquid out of and into any one of the tanks, during which time a desired amount of the liquid may be withdrawn for use.

Still another object of the invention is to supply a storage unit including a number of tanks which permits the withdrawal of heated liquid from one of the tanks while the other is being cleansed or subjected to other maintenance work.

A still further object of the invention is to provide one or more liquid storage tanks that are enveloped by a shell which contains circulating heating air, with the lower part of the shell serving as a fire dike that contains the full combined storage capacity of the tanks in the event of a tank rupture or occurrence of unavoidable leaks in the piping associated with the tanks.

Yet another object of the invention is to provide one or more storage tanks for a heated liquid that are enveloped in an exterior shell, with the tanks, shell, heating accessories, air-circulating blower, pumps, piping and valving being supported on a single base to permit the liquid storage and distribution unit to be moved as a whole.

These and other objects and advantages of the invention will become apparent from the following description thereof, taken in conjunction with the accompanying drawings wherein:

FIGURE 3 is a longitudinally extending section of the unit shown in FIGURE 1, but partly in elevation;

FIGURE 4 is a transverse cross-sectional view of a portion of the unit shown in FIGURE 3, taken on the line 4—4 thereof;

Figure 1:
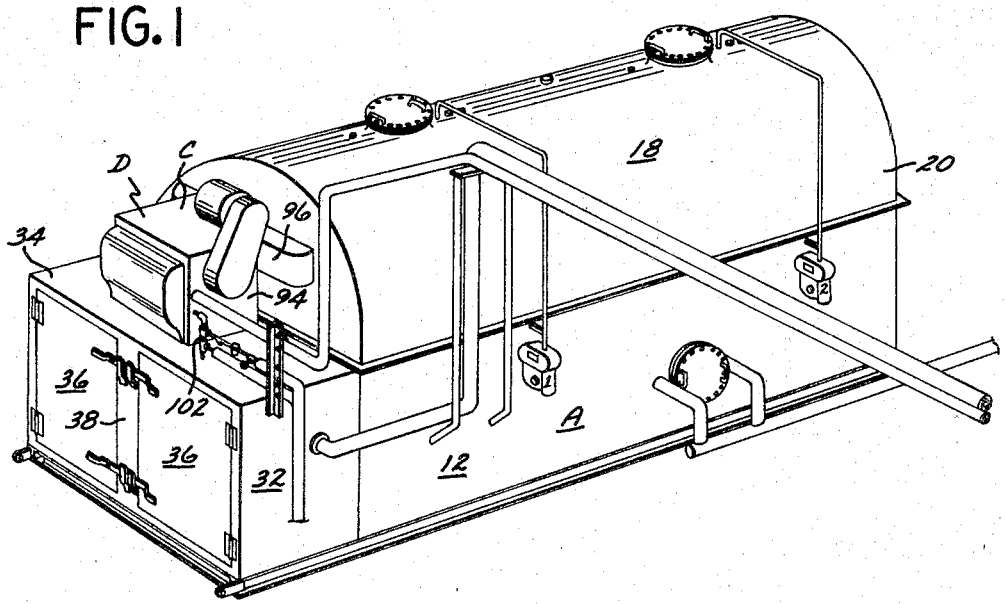
FIGURE 1 is a perspective view of the heated liquid storage unit and liquid distribution system thereof.
Figure 2:
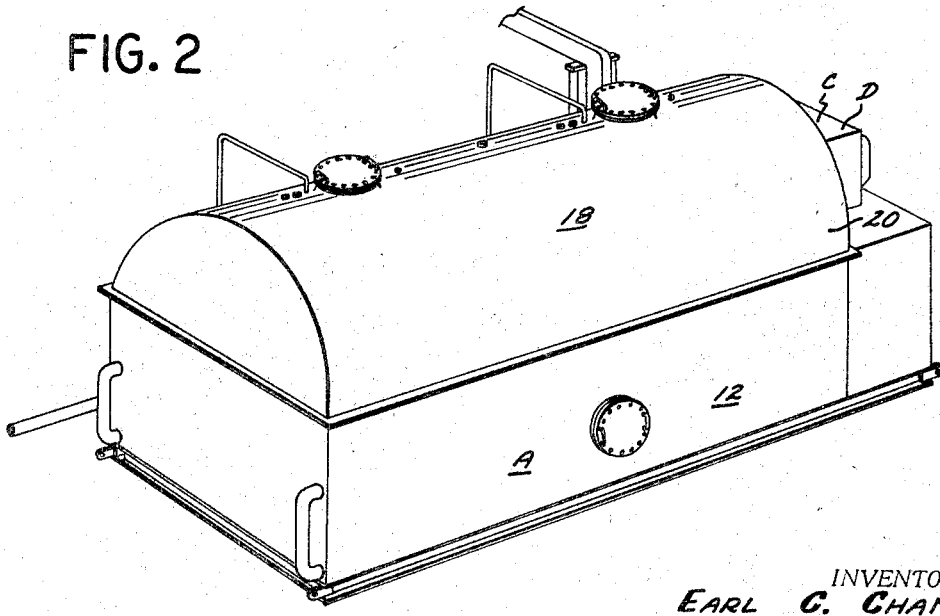
FIGURE 2 is a perspective view of the unit shown in FIGURE 1, taken from the opposite side thereof.

With continued reference to the drawings for the general arrangement of the invention, it will be seen in FIGURES 1–3 to include an exterior shell A that is defined by a floor 10, two side walls 12 that extend upwardly therefrom, with the side walls thereof being connected at their ends by first and second end walls 14 and 16. Shell A further includes a semi-circular top 18, best shown in FIGURES 1 and 2. Top 18 develops into semi-cylindrical side walls 20 (FIGURE 1), the first and second end pieces 14a and 16a of which are in vertical alignment with walls 14 and 16, as may be seen in FIGURE 3.

The upper ends of the side walls 12 and first and second end walls 14 and 16 are provided with a continuous, outwardly extending flange 22 that may be formed by angle iron welded to the exterior surfaces of the side walls and end walls. Similar flanges 22a are provided on the lower edge portions of the side wall 20 and end pieces 14a and 16a of top 18. Flanges 22a rest on the flanges 22, and are removably secured thereto by bolts (not shown), or other conventional fastening means.

The floor 10, as can best be seen in FIGURES 1 to 3, is supported on a rectangular framework 24 comprised of structural members of substantial strength such as channels, I-beams, or the like. Lugs 26 in which openings 28 are formed, extend from the ends of the framework 24 whereby the liquid storage and distributing unit may be moved as a whole, as desired. The framework 24 supports a heated chamber B adjacent the first end pieces 14a, as shown in FIGURES 1 and 3, in which pumps, piping and valves to be described hereinafter, that are used in distributing and pumping the heated liquid are contained and maintained at an elevated temperature.

The chamber B includes a floor 30, two side walls 32 which are extensions of side walls 12, and a top 34. Two rear doors 36 and a rearwardly situated, centrally disposed dividing strip 38 serve to complete the heated chamber. The first end wall 14 (FIGURE 3) serves to define the forward portion of the heated chamber B. A blower C is mounted on the upper portion of the heated chamber B, and is driven by an electric motor 40, or other suitable prime mover. A heater D is mounted adjacent blower C and is used in heating air prior to discharge thereof by blower C into the interior of the shell A, as well as after it has circulated in the shell, as will later be explained.

First and second elongate liquid storage tanks E and E' are provided, which are disposed in end-to-end longitudinally spaced relationship within the confines of the shell A, as shown in FIGURE 3. Tanks E and E' are structurally identical so that a detailed description of only one is given. The elements in tank E corresponding to those in tank E are identified by the same numerals, but to which a prime has been added.

The tank E includes a cylindrical side wall 42 and first and second ends 44 and 46, respectively. A flanged manhole 48 is provided in the upper portion of side wall 42 on which a cover 50 is removably maintained by bolts 52, or other suitable fastening means. It will be noted in FIGURE 3 that two longitudinally spaced, flanged manholes 54 and 54' are also provided in the upper portion of the top 18 of shell A, which are in vertical alignment with the manholes 48 and 48'. Covers 56 and 56' are removably secured to manholes 54 and 54' by bolts 58 and 58'.

Figure 5:
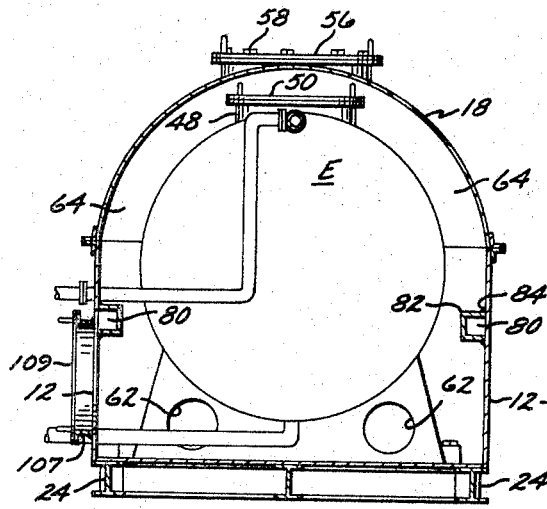
FIGURE 5 is a transverse cross-sectional view of the unit shown in FIGURE 3, taken on the line 5—5 thereof.

The tanks E and E' are supported at desired elevated positions above the floor 10 by longitudinally spaced, transverse cradles 60 and 60', as best seen in FIGURES 3 and 5, in which openings 62 of substantial size are formed. The dimensions of tanks E and E' relative to the shell A are such that the exterior surfaces of the tanks are separated from the interior surfaces of the shell by a longitudinally extending space 64. Also, tanks E and E' are separated by a space 66, and the ends 44 and 46' of the tanks are separated from the end walls 14 and 16 by spaces 68 and 70, respectively. Tanks E and E' are preferably formed from steel, or other metal or alloy of good heat conducting characteristics, and are lined (not shown) with a material such as a baked phenolic resin that is inert to the action of liquid oils and fats.

The dimensions of the floor 10, side walls 12, and end walls 14 and 16 are such that they provide a fire dike sufficient to hold the entire liquid contents of the tanks E and E' should the tanks or piping associated therewith leak or rupture. The cylindrical top 18 is maintained spaced apart from tanks E and E' by a number of bolts 72, as shown in FIGURE 3.

Figure 6:
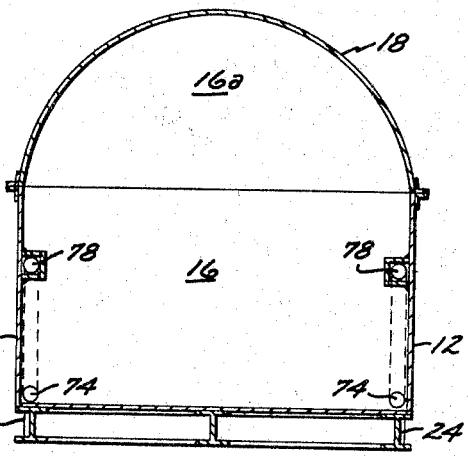
FIGURE 6 is a transverse cross-sectional view of the unit shown in FIGURE 3, taken on the line 6—6 thereof.

Two transversely spaced openings 74 are formed in the lower portion of the second end wall 16 (FIGURE 6). Two conduits 76 are connected to the openings 74 and extend upwardly on the exterior surface of the end wall 16 where they are connected to two transversely spaced openings 78 formed therein. Openings 78, as can best be seen in FIGURES 3, 5 and 6, communicate with two passages 80 that extend longitudinally along the interior surfaces of the side walls 12.

The passages 80 are defined by two channel-shaped members 82 that are secured to the side walls 12 by welding beads 84, or like fastening means. The members 82 (FIGURE 3) communicate with openings 86 formed in the end wall 14, and these openings are connected to two downwardly extending conduits 88 which terminate a short distance above the floor 10 in the heated chamber B.

The blower C and heater D are of conventional design and are housed in a sheet metal enclosure that is defined by a forward end wall 90, a rear wall 92, side walls 94, and a top 96. The top 34 of the heated chamber B serves as a base on which the blower C and heater D rest. An opening 98 is formed in the end wall 90 of blower C that is in communication with a transverse duct 100 located adjacent the exterior surface of the end piece 14a, as shown in FIGURES 3 and 4.

The ends of duct 100 are in communication with two transversely spaced openings 102 formed in the end piece 14a. Two down-turned duct sections 104 are secured to the forward face of end piece 14a, and communicate with the openings 12. The duct sections 104 direct air from the blower C downwardly into space 68, with the air so discharged following the path indicated by arrows in FIGURE 3.

The heater D is preferably located rearwardly of the blower C, which heater includes stem coils (not shown) to which heat is supplied from a boiler or other source (not shown) through conventional piping 106 shown in FIGURE 1. An opening 108 is formed in top 34, which may best be seen in FIGURE 3, through which heated air from the chamber B flows upwardly to pass through the heater D, and then pass into the suction (not shown) of blower C, to be discharged through the duct sections 104.

When the heated air discharges from the duct sections 104 it moves downwardly as two streams to the floor 10 where it travels longitudinally towards the second end wall 16, and then rises, as shown by the arrow in FIGURE 3, to circulate through the space 64 towards the first end wall 14. The heated air continues to circulate through this endless path. As the two streams of air so circulate, portions of the air travel transversely toward one another to intermingle, as well as portions of the lower stream of air which move upwardly to intermingle with portions of the circulating air moving toward the first end wall 14.

In this manner, the tanks E and E' are continuously subjected to a moving blanket of air which contacts the ends 44, 46 and 44' and 46', as well as the side walls 42 and 42' thereof. Parts of the two longitudinally moving streams of air flow through the transverse space 66 to intermingle. Because of the lighter weight thereof, the outer fringes of the two streams of air traveling along the floor 10 tend to move upwardly, as indicated by the arrows in FIGURE 3, to intermingle with the portions of the heated air moving adjacent top 18 towards the first end wall 14.

Portions of the heated air circulating in the manner described will enter the openings 74 to flow through the conduits 76 and enter the passages 80 (FIGURE 5), with the air flowing through the passages to the conduits 88 and then into the heated chamber B. After the air discharge from conduits 88 into the chamber B, it rises therein to flow through an opening 103 formed in top 34 to again be heated by the heater D to a predetermined temperature and discharged from the duct sections 104 into the confines of the shell A. The heated air maintains the liquids in the tanks E and E' at substantially the predetermined temperature.

The channel-shaped members 82 are warmed by the heated air within the shell A in the same manner as the tanks E and E' are heated, and air is returned through the passages 80 to chamber B, it sustains no appreciable heat loss. Access into the shell A for repair purposes, may be made through a flanged manhole 107 (FIGURE 5) that extends outwardly from one of the side walls 12, which manhole is normally covered by a plate 109 that is bolted or otherwise secured thereto.

Figure 7:
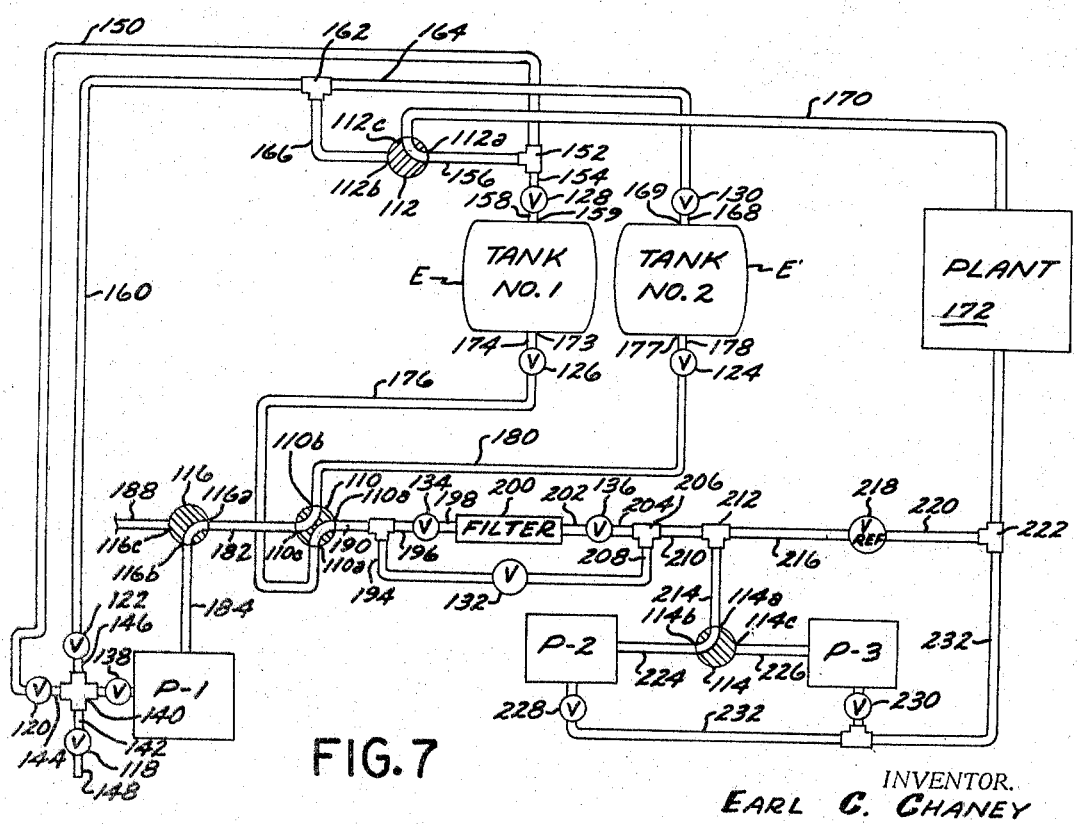
FIGURE 7 is a diagrammatic view of the liquid storage unit and the piping and pumping system associated therewith.

The distribution system used in handling the liquid in tanks E and E' is shown in FIGURE 7. This equipment is housed in the heated chamber B, and is accordingly maintained at an elevated temperature to minimize heat loss as the liquid is moved into and out of tanks E and E'.

In FIGURE 7 it will be seen that the distribution equipment includes a four-way, four port valve 110 that can occupy either a first or second position. Also, it will be seen that three valves 112, 114 and 116 are provided that are of the three-way, three port type, each of which can occupy either a first or second position. The liquid distributing system also includes three plug valves 118, 120 and 122, as well as gate valves 124, 126, 128, 130, 132, 134 and 136. Three motor-driven pumps P–1, P–2 and P-3 are provided, with the pump P-3 serving as a stand-by unit.

The discharge of pump P-1 is connected to a check valve 138, which in turn is connected to a tubular cross fitting 140. Fitting 140 is connected by three conduits 142, 144 and 146 to valves 118, 120 and 122 respectively. Valve 118 is connected to a conduit 148 through which heated liquid can be pumped to a tank truck or other transport.

The valve 120 is connected to a conduit 150 that extends to a T 152 from which conduits 154 and 156 lead to valve 128 and port 112a of valve 112 respectively. Valve 128 is connected by a conduit 158 to the liquid inlet 159 of first tank E.

Valve 122 communicates with a conduit 160 that extends to a T 162 from which two conduits 164 and 166 lead. Conduit 164 in turn communicates with valve 130, and this valve is connected by a conduit 168 to the liquid inlet 169 of second tank E'. Conduit 166 extends to port 112b of valve 112. Port 112c of valve 112 is connected to a conduit 170 that extends from the bakery or plant 172 where the heated oil is used.

Heated oil can be removed from a liquid outlet 173 of tank E through a conduit 174 connected to valve 126. Valve 126 also communicates with a conduit 176 that extends to port 110a of valve 110. Heated oil can be withdrawn from second tank E' through a liquid outlet 177 by a conduit 178 that leads to valve 124, and this valve is connected by a conduit 180 to port 110b of valve 110.

Port 110c of valve 110 is connected to a conduit 182 that extends to port 116a of valve 116. A conduit leads from port 116b of valve 116 to the suction 186 of pump P-1. The port 116c is connected to a conduit 188 that may be connected to a tank truck, or the like (not shown), in which oil is delivered for subsequent use in plant 172.

A port 110d of valve 110 is connected to a conduit 190 that extends to a first T 192, which in turn is joined by conduits 194 and 196 to valves 132 and 134, respectively. Valve 134 is connected to a filter 200 by means of a conduit 198, and by means of a second conduit 202 this filter is connected to valve 136. A conduit 204 connects valve 136 to a second T 206 from which conduits 208 and 210 extend. Conduit 208 is connected to valve 132, and conduit 210 is joined to a third T 212 from which conduits 214 and 216 lead.

Conduit 214 extends to port 114a of valve 114, and conduit 216 leads to a relief valve 218, which in turn is joined by a conduit 220 to a fourth T 222. The suctions of pumps P-2 and P-3 are connected by conduits 224 and 226 to ports 114b and 114c of valve 114, respectively. The discharge sides of pumps P-2 and P-3 are connected to check valves 228 and 230 which communicate with a header 232 leading to fourth T 222. By means of a conduit 234 T 222 is connected to plant 172 in which the heated oil is used, or circulated to the conduit 170.

When valve 110 is in a first position it establishes communication between conduits 180 and 182 and conduits 190 and 176, respectively, and when valve 110 is in a second position, communication is established between conduits 180 and 190 and 182 and 176, respectively.

Communication between conduits 156 and 170 is effected when valve 112 is in a first position, and when this valve is in a second position, conduits 170 and 166 are in communication. Valve 114, when in a first position, establishes communication between conduits 214 and 226, and when in a second position, between conduits 214 and 224. Communication is established between conduits 182 and 184 when valve 116 is in a first position, and when it is in a second position, conduits 188 and 184 are in communication.

The distribution system above described permits delivery of liquid from a carrier (not shown) to either tank E or E'. Also, liquid in tank E or E' can be delivered therefrom to a carrier through conduit 148. The heated liquid can be drawn from either tank E or E' and discharged to a use station in plant 172, and the unused liquid may be circulated back to the tank from which it is withdrawn. In addition, this distribution system permits transfer of liquid from either tank E or E' to the other as required. The recirculation of liquid back to either tank E or E' maintains the liquid in an agitated condition therein, whereby no bacterial growth will take place. Thus, liquid can be stored in tank E or E' without bacterial growth and without the necessity of using a blanket of nitrogen.

Examples of use of the system of the present invention are described hereinafter. By operating pumps P-1 and P-2 and placing valve 110 in the first position, with valves 114 and 116 in the second positions, valves 118 and 120 in closed positions, and valve 122 in the open position, heated liquid can be delivered from first tank E to plant 172, and second tank E' filled with liquid from a tank truck (not shown) connected to conduit 188.

Operation of this system, but with the valve 116 in the first position, permits circulation of heated liquid outside tank E' and then return thereof to the tank.

Should it be desired to discharge liquid from tank E' through conduit 148 to a carrier, pumps P-1 and P-2 are operated, valves 110 and 116 are placed in first positions, valve 114 in a second position, valve 118 is opened, and valves 120 and 122 closed.

Heated liquid can be transferred from tank E' to tank E by operating both pumps P-1 and P-2, placing valves 110 and 116 in first positions, valve 114 in a second position, valve 120 in an open position, and valves 118 and 122 in closed positions.

To deliver heated liquid from tank E' to plant 172, as well as load tank E from a tank truck (not shown), pumps P-1 and P-2 are operated, with valves 112, 114 and 116 in second positions, valves 118 and 122 closed, and valve 120 open. Heated liquid can be recirculated outside tank E by operating the system as just previously described, but with the valve 116 moved to the first position.

Liquid in tank E can be unloaded to a carrier through conduit 148 by operating both pumps P-1 and P-2, with valves 112, 114 and 116 in second positions, valve 118 open, and valves 120 and 122 closed.

Heated liquid can be transferred from tank E to tank E' by operating both pumps P-1 and P-2, with valves 112, 114 and 116 in second positions, valves 118 and 120 closed, and valve 120 open.

To perform any one of the above described operations with the stand-by pump P-3, the valve settings remain the same, except that valve 114 is placed in the first position.

The use and operation of the invention have been described in detail previously and need not be repeated.

Although the present invention is fully capable of achieving the objects and providing the advantages hereinbefore mentioned, it is to be understood that it is merely illustrative of the presently preferred embodiment thereof and I do not mean to be limited to the details of construction herein shown and described, other than as defined in the appended claims.

I claim:

1. A unit for maintaining stored liquid at a predetermined elevated temperature, including:
(a) first and second elongate, longitudinally aligned tanks in spaced relationship having first and second liquid inlets and first and second liquid outlets formed therein;
(b) a shell that envelops said tanks, which shell is outwardly spaced therefrom and includes a floor, a top, two side walls, and first and second end walls;
(c) first means for supporting said first and second tanks in spaced relationship relative to said floor;

(d) an air heater for heating air to a predetermined temperature;
(e) a power-driven blower disposed adjacent said heater;
(f) second means for supporting said heater and blower adjacent said first end wall;
(g) third means for directing said heated air discharged by said blower to two laterally spaced positions adjacent the upper interior surface of said first end wall from which it discharges downwardly to pursue an endless longitudinally oriented path in said shell, with said streams as they traverse said path moving both laterally and vertically to intermingle and envelop said tanks with a blanket of heated air of said predetermined temperature to maintain liquid in said tanks at substantially said predetermined temperature due to transfer of heat from said air through the material defining said tanks;
(h) fourth means for bypassing a portion of said heated air as it circulates in said shell back to said heater to be reheated to said predetermined temperature and discharged back into said shell to traverse said endless path;
(i) power-driven pump means;
(j) valve means for selectively controlling the flow of liquid to and from said pump means; and
(k) conduit means for so connecting said pump means, valve means, first and second inlets and first and second outlets, which when said valve means is manipulated, permit said pump means to selectively pump said liquid from either a carrier to either said first or second tank, from said first or second tank to a carrier, from either said first or second tank to a use station, and from either said first or second tank to the other thereof.

2. A unit as defined in claim 1 wherein said second means is hollow and defines a confined space therein, which confined space is in communication with said heater and blower as well as said fourth means, with said pump means and at least a portion of said valve means and conduit means being disposed in said confined space and heated by air from said fourth means as it moves through said confined space towards said heater and blower, which heated pump means, valve means and conduit means minimize heat loss from said heated liquid or the same is moved by said pump means.

3. A unit as defined in claim 2 which further includes:
(1) at least one movable door on said second means that may be disposed in an open position to permit access to said pump means and those portions of said valve means and conduit means disposed in said confined space.

4. A unit as defined in claim 1 wherein that portion of said shell below said top is of sufficient capacity to hold all of the liquid in said first and second tanks should the same inadvertently rupture.

5. A unit as defined in claim 1 wherein said third means comprise ducts that are in communication with the discharge from said blower, with at least a portion of said ducts being transversely disposed inside said shell adjacent said first end wall.

6. A unit as defined in claim 1 wherein at least a portion of said fourth means are disposed outside of said shell.

7. A unit as defined in claim 1 wherein at least a portion of said fourth means comprises longitudinal passages defined by channels affixed to the interior surfaces of said side walls, and said passages are in communication with said confined space.

8. A unit as defined in claim 7 wherein said fourth means includes two conduits disposed outside of said shell, which conduits connect said passages to two laterally spaced openings formed in the lower portion of said second end wall.

9. A unit for holding a liquid at a controlled temperature comprising:
(a) an elongate tank having a cylindrical side and first and second ends;
(b) a shell including a floor, a top, two side walls and first and second end walls, which shell encloses said tank, and is of such dimensions as to define spaces between said shell and side wall and first and second ends of said tank;
(c) second means for supporting said tank at a fixed elevation above said floor;
(d) an air heater;
(e) a power-driven blower provided with a suction and discharge, with said discharge being so disposed as to serve to direct air from said blower through said heater;
(f) first duct means for directing heated air from said heater to two laterally spaced positions adjacent the upper portion of said first end wall from which it is directed downwardly in two streams to flow over said first end of said tank, then longitudinally along said floor towards said second end wall, upwardly therefrom, and then longitudinally along said top towards said first end wall, with portions of said two streams as they circulate moving laterally and upwardly to intermingle and envelope the exterior surface of said tank with a blanket of heater air of substantially uniform temperature;
(g) two recirculation air ducts that extend longitudinally along the interiors of said side walls and pass through openings formed in said first side wall;
(h) second duct means adjacent said second end wall for withdrawing a part of said heated air as it circulates in said shell and directing said withdrawn air into said recirculation air ducts;
(i) third hollow means located exteriorly of said shell and adjacent said first end wall thereof for supporting said blower and heater, and in addition providing a connection between said second duct means and said suction of said blower;
(j) a power-driven pump; and
(k) piping means connected to said pump and tank for selectively:
(1) filling said tank from a delivery carrier; and
(2) recirculating said liquid located exteriorly of said tank past a use station where said liquid can be withdrawn as required.

No references cited.

M. CARY NELSON, *Primary Examiner.*

R. J. MILLER, *Assistant Examiner.*